(12) United States Patent
Bae

(10) Patent No.: US 11,772,203 B2
(45) Date of Patent: Oct. 3, 2023

(54) LASER PROCESSING SYSTEM AND METHOD

(71) Applicant: NPS CO., LTD., Cheongju-si (KR)

(72) Inventor: Seong Ho Bae, Daejeon (KR)

(73) Assignee: NPS CO., LTD., Cheongju-si (KR)

( * ) Notice: Subject to any disclaimer, the term of this patent is extended or adjusted under 35 U.S.C. 154(b) by 18 days.

(21) Appl. No.: 17/178,097

(22) Filed: Feb. 17, 2021

(65) Prior Publication Data

US 2021/0252647 A1 Aug. 19, 2021

(30) Foreign Application Priority Data

Feb. 17, 2020 (KR) ........................ 10-2020-0018738
May 13, 2020 (KR) ........................ 10-2020-0056878

(51) Int. Cl.
*G05B 19/418* (2006.01)
*B23K 26/70* (2014.01)

(52) U.S. Cl.
CPC ........ *B23K 26/70* (2015.10); *G05B 19/41875* (2013.01); *G05B 2219/32368* (2013.01); *G05B 2219/33198* (2013.01)

(58) Field of Classification Search
None
See application file for complete search history.

(56) References Cited

U.S. PATENT DOCUMENTS

| | | | | |
|---|---|---|---|---|
| 10,773,459 B2* | 9/2020 | Amaya | ................... | B22F 12/90 |
| 2009/0308854 A1* | 12/2009 | Wen | ....................... | B23K 26/40 |
| | | | | 700/193 |
| 2012/0103951 A1* | 5/2012 | Takada | ................... | B23K 26/08 |
| | | | | 219/121.67 |
| 2013/0178952 A1* | 7/2013 | Wersborg | ........... | G06V 10/7715 |
| | | | | 700/47 |
| 2016/0059371 A1* | 3/2016 | Chang | ................ | B23Q 17/2471 |
| | | | | 700/189 |
| 2017/0113300 A1* | 4/2017 | Lüdi | .................... | B23K 26/032 |
| 2020/0189027 A1* | 6/2020 | Lim | ..................... | B23K 26/046 |
| 2020/0301403 A1* | 9/2020 | Izumi | .................... | B23K 26/38 |

FOREIGN PATENT DOCUMENTS

| | | | |
|---|---|---|---|
| CN | 102463412 B | * | 4/2014 |
| JP | 2002239760 A | * | 8/2002 |
| JP | 2011-173170 A | | 9/2011 |
| KR | 100788438 B1 | * | 12/2007 |

\* cited by examiner

*Primary Examiner* — Jason Lin
(74) *Attorney, Agent, or Firm* — Bridgeway IP Law Group, PLLC; Jihun Kim

(57) ABSTRACT

A laser processing system includes a processing machine for performing laser processing on a processing target using a laser beam according to a predetermined processing design; a setting module for preparing a processing recipe including a plurality of set values for testing of processing parameters for the controlling the quality value of a predetermined quality item; a controller for repeatedly performing test processing for the processing target in multiple implementation rounds by driving the processing machine by selectively using any one of the set values for testing as the set value of the processing parameters according to a predetermined order; and an analysis module for analyzing each of results of the test processing and individually measuring the quality value of each of the results of the test processing.

11 Claims, 13 Drawing Sheets

[FIG. 1]
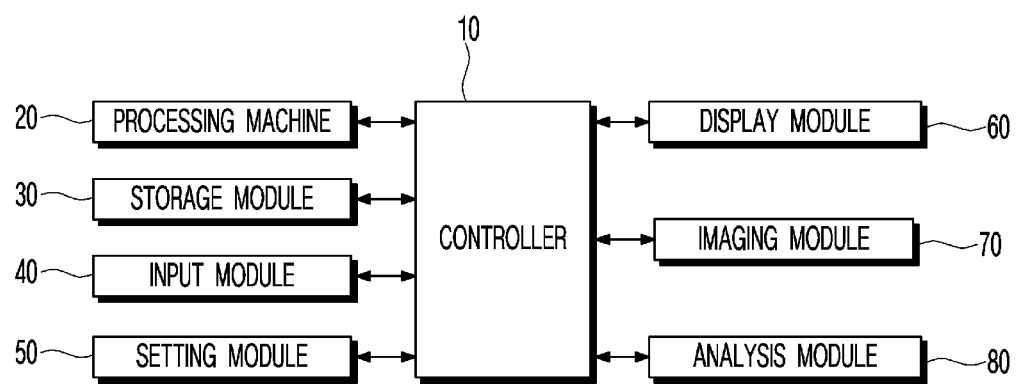

[FIG. 2]
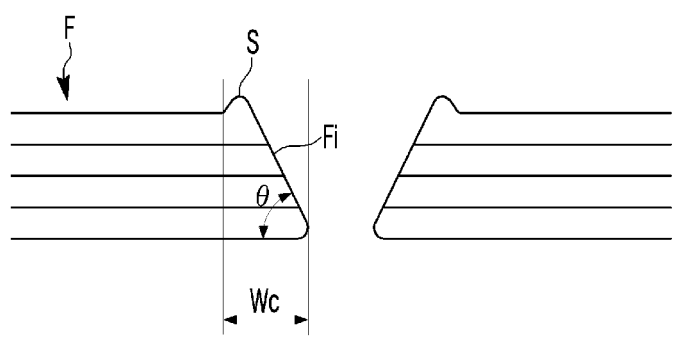

[FIG. 3]
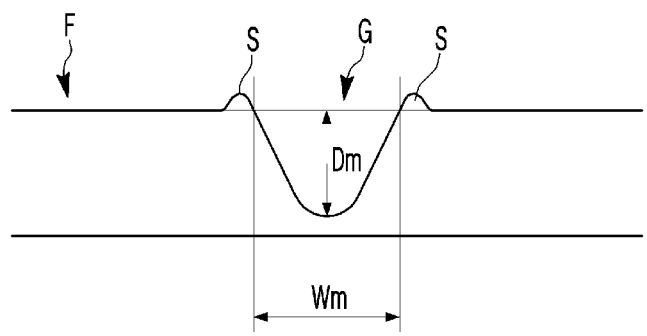

[FIG. 4]
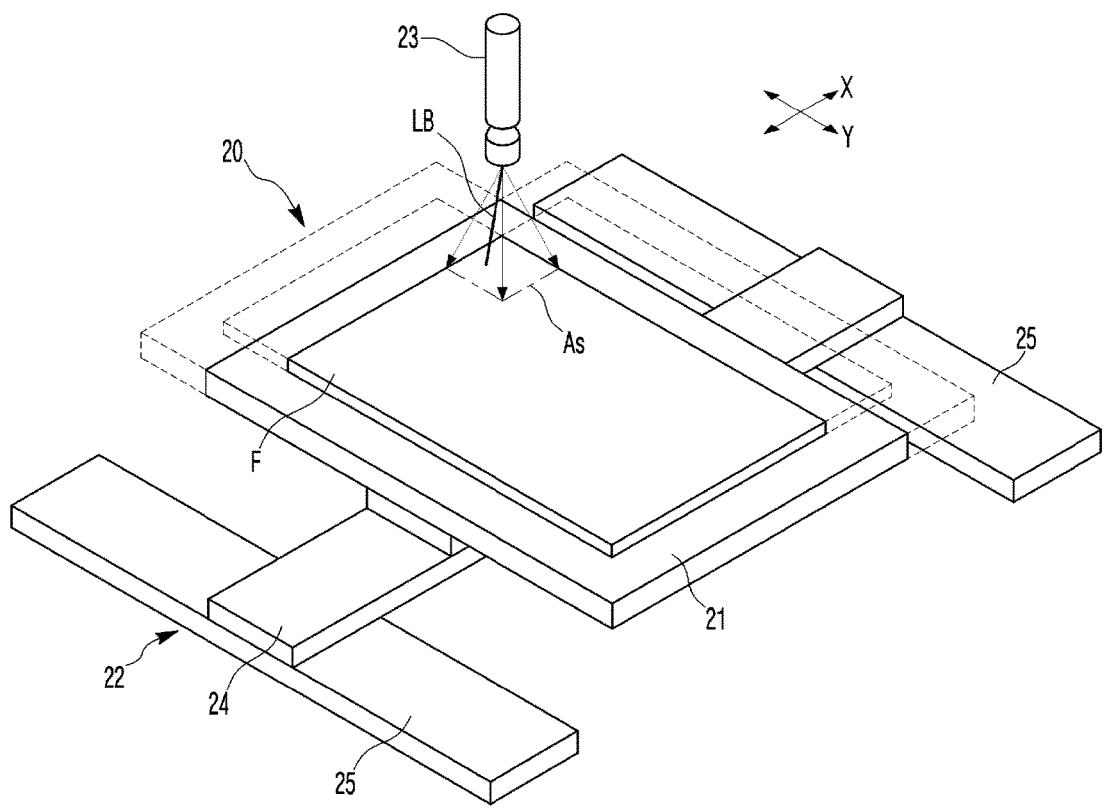

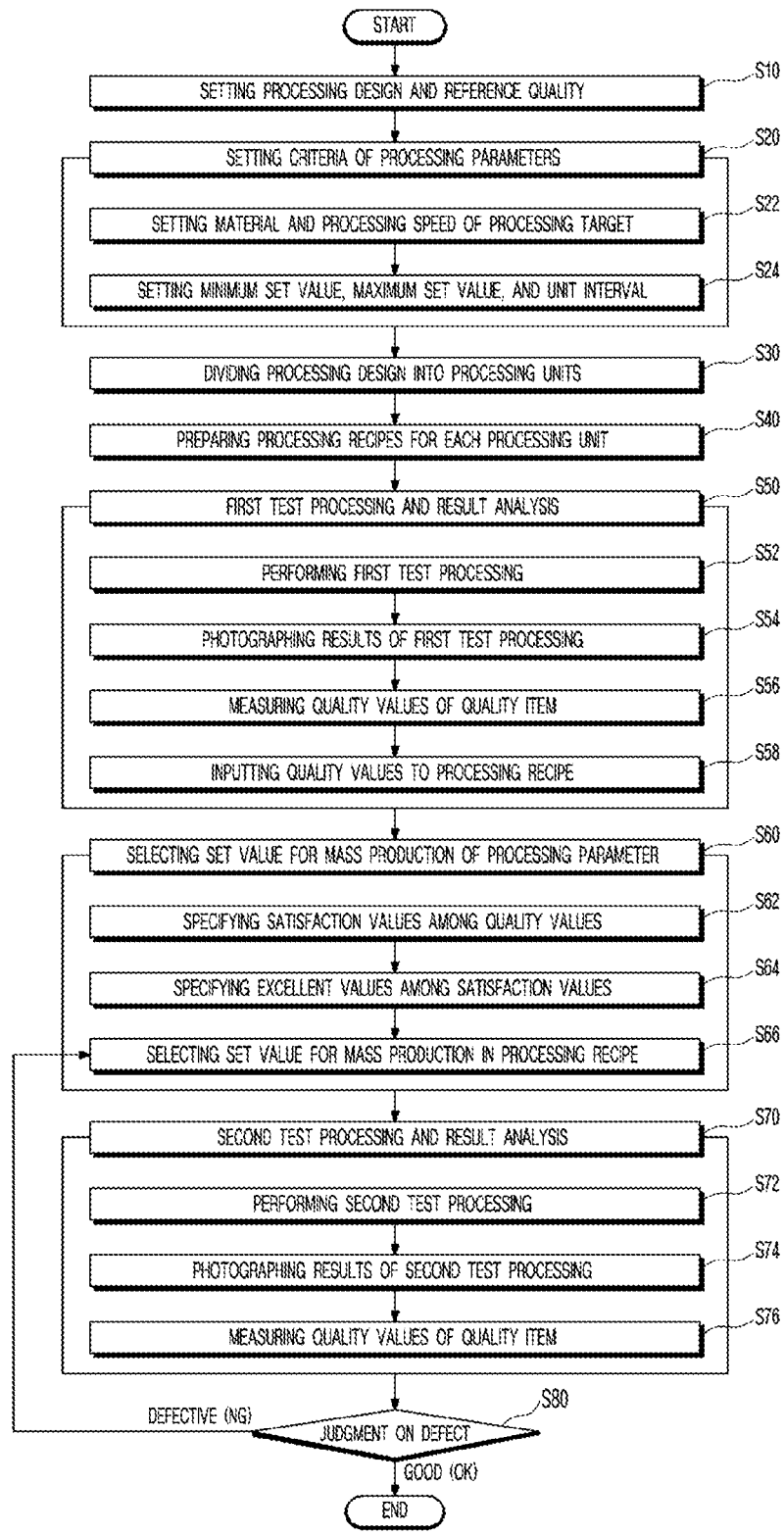
[FIG. 5]

[FIG. 6]
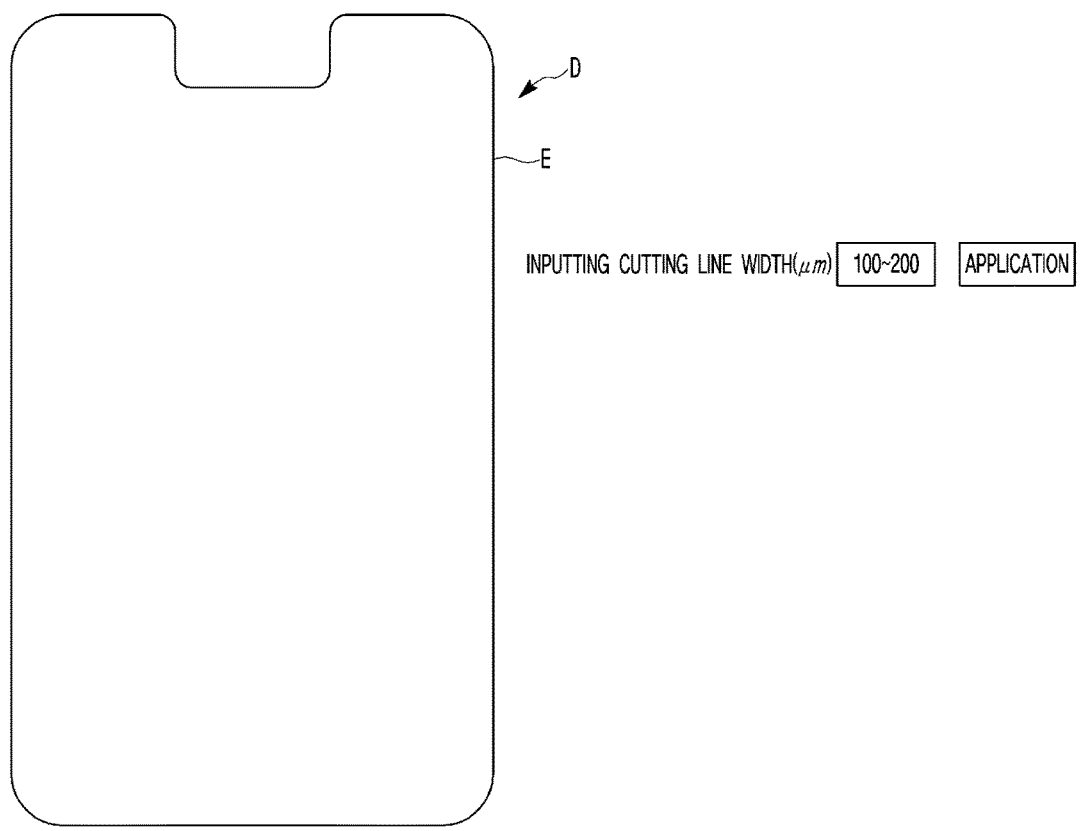

[FIG. 7]

MATERIAL SELECTION

| | FILM | METAL | PAPER | WOOD | OTHERS |

SPEED SELECTION

PROCESSING SPEED (mm/s) | 700 | APPLICATION

SETTING

| | MANUAL SETTING UNIT INTERVAL | AUTOMATIC SETTING UNIT INTERVAL | MINIMUM SET VALUE | MAXIMUM SET VALUE |
|---|---|---|---|---|
| POWER (W) | | 5 | 20 | 100 |
| FREQUENCY (kHz) | | 5 | 5 | 100 |
| PULSE WIDTH ($\mu$s) | | 0.5 | 3 | 20 |
| Duty (%) | | 1 | 20 | 40 |
| FOCUS (mm) | | 0.1 | 21 | 23 |
| GAS PRESSURE (Bar) | | 1 | 3 | 7 |

APPLICATION

[FIG. 8]
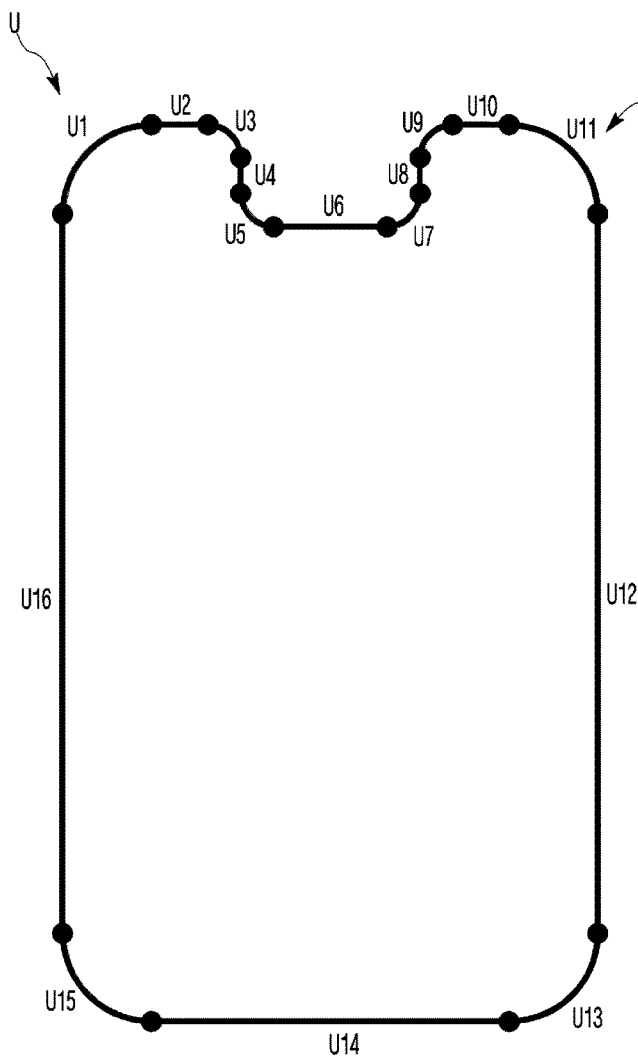
| PROCESSING UNIT(U) | PROCESSING SHAPE |
|---|---|
| U1 | CURVED LINE (R=10) |
| U2 | STRAIGHT LINE |
| U3 | CURVED LINE (R=2) |
| U4 | STRAIGHT LINE |
| U5 | CURVED LINE (R=3) |
| U6 | STRAIGHT LINE |
| U7 | CURVED LINE (R=3) |
| U8 | STRAIGHT LINE |
| U9 | CURVED LINE (R=2) |
| U10 | STRAIGHT LINE |
| U11 | CURVED LINE (R=10) |
| U12 | STRAIGHT LINE |
| U13 | CURVED LINE (R=10) |
| U14 | STRAIGHT LINE |
| U15 | CURVED LINE (R=10) |
| U16 | STRAIGHT LINE |
| TOTAL NUMBER OF SET VALUES FOR TESTING | 576 |

[FIG. 9]

| REFERENCE SET VALUE | | | | | |
|---|---|---|---|---|---|
| POWER (W) | FREQUENCY (kHz) | PULSE WIDTH ($\mu s$) | Duty (%) | FOCUS (mm) | GAS PRESSURE (Bar) |
| 50 | 20 | 10.0 | 30 | 22.0 | 5 |

| Curve Recipi (R=2) | | | | | | | | | | | |
|---|---|---|---|---|---|---|---|---|---|---|---|
| POWER (W) | QUALITY VALUE ($\mu m$) | FREQUENCY (kHz) | QUALITY VALUE ($\mu m$) | PULSE WIDTH POWER (W) | QUALITY VALUE ($\mu m$) | Duty POWER (W) | QUALITY VALUE ($\mu m$) | FOCUS POWER (W) | QUALITY VALUE ($\mu m$) | GAS PRESSURE POWER (W) | QUALITY VALUE ($\mu m$) |
| 20 | | 5 | | 3.0 | | 20 | | 21.0 | | 3 | |
| 25 | | 10 | | 3.5 | | 21 | | 21.1 | | 4 | |
| 30 | | 15 | | 4.0 | | 22 | | 21.2 | | 5 | |
| 35 | | 20 | | 4.5 | | 23 | | 21.3 | | 6 | |
| 40 | | 25 | | 5.0 | | 24 | | 21.4 | | 7 | |
| 45 | | 30 | | 5.5 | | 25 | | 21.5 | | | |
| 50 | | 35 | | 6.0 | | 26 | | 21.6 | | | |
| 55 | | 40 | | 6.5 | | 27 | | 21.7 | | | |
| 60 | | 45 | | 7.0 | | 28 | | 21.8 | | | |
| 65 | | 50 | | 7.5 | | 29 | | 21.9 | | | |
| 70 | | 55 | | 8.0 | | 30 | | 22.0 | | | |
| 75 | | 60 | | 8.5 | | 31 | | 22.1 | | | |
| 80 | | 65 | | 9.0 | | 32 | | 22.2 | | | |
| 85 | | 70 | | 9.5 | | 33 | | 22.3 | | | |
| 90 | | 75 | | 10.0 | | 34 | | 22.4 | | | |
| 95 | | 80 | | 10.5 | | 35 | | 22.5 | | | |
| 100 | | 85 | | 11.0 | | 36 | | 22.6 | | | |
| | | 90 | | 11.5 | | 37 | | 22.7 | | | |
| | | 95 | | 12.0 | | 38 | | 22.8 | | | |
| | | 100 | | 12.5 | | 39 | | 22.9 | | | |
| | | | | 13.0 | | 40 | | 23.0 | | | |
| | | | | 13.5 | | | | | | | |
| | | | | 14.0 | | | | | | | |
| | | | | 14.5 | | | | | | | |
| | | | | 15.0 | | | | | | | |
| | | | | 15.5 | | | | | | | |
| | | | | 16.0 | | | | | | | |
| | | | | 16.5 | | | | | | | |
| | | | | 17.0 | | | | | | | |
| | | | | 17.5 | | | | | | | |
| | | | | 18.0 | | | | | | | |
| | | | | 18.5 | | | | | | | |
| | | | | 19.0 | | | | | | | |
| | | | | 19.5 | | | | | | | |
| | | | | 20.0 | | | | | | | |

[FIG. 10]
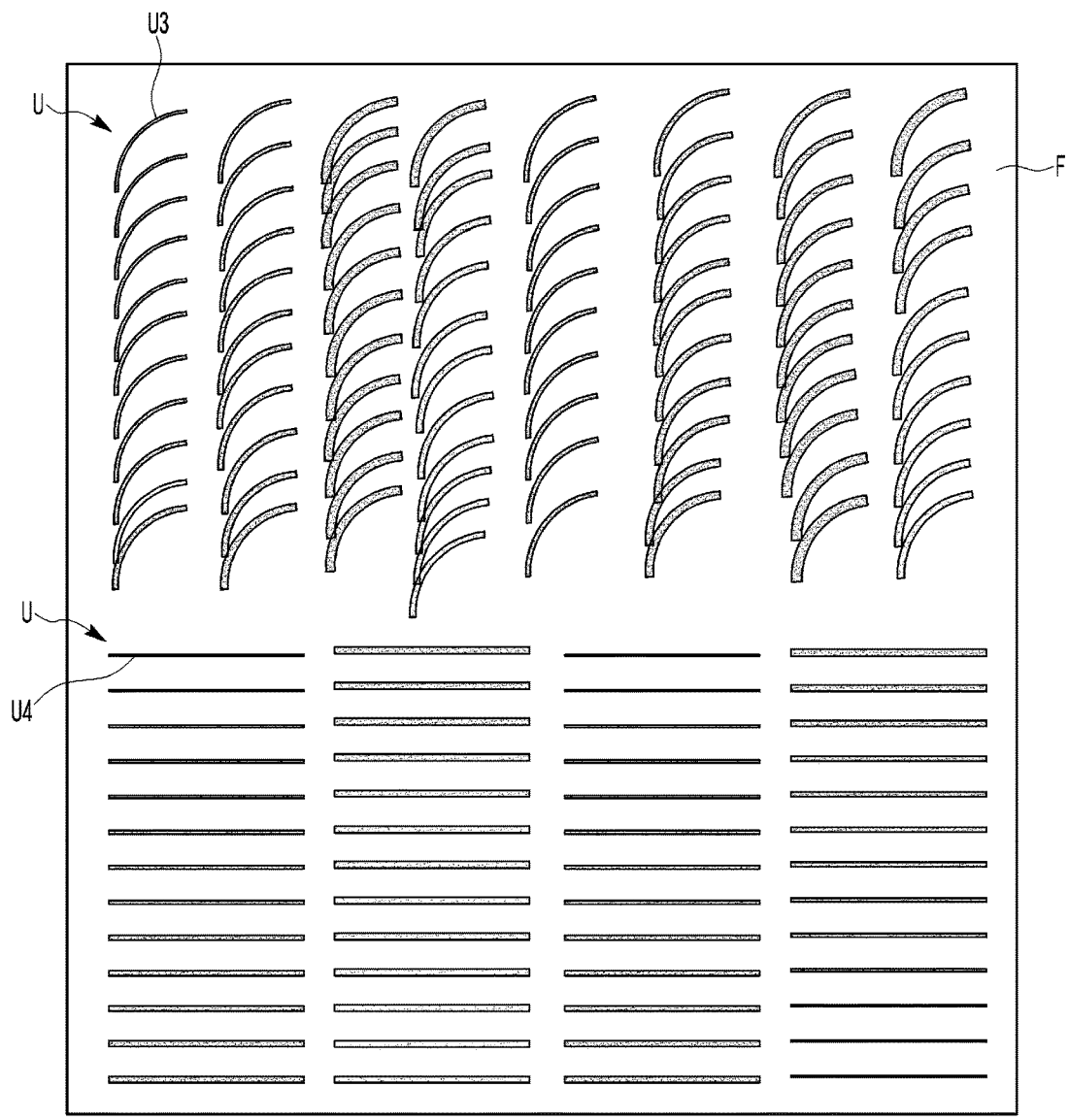

[FIG. 11]

| REFERENCE SET VALUE | | | | | |
|---|---|---|---|---|---|
| POWER (W) | FREQUENCY (kHz) | PULSE WIDTH ($\mu s$) | Duty (%) | FOCUS (mm) | GAS PRESSURE (Bar) |
| 50 | 20 | 10.0 | 30 | 22.0 | 5 |

| Curve Recipi (R=2) | | | | | | | | | | | |
|---|---|---|---|---|---|---|---|---|---|---|---|
| POWER (W) | QUALITY VALUE ($\mu m$) | FREQUENCY (kHz) | QUALITY VALUE ($\mu m$) | PULSE WIDTH POWER (W) | QUALITY VALUE ($\mu m$) | Duty POWER (W) | QUALITY VALUE ($\mu m$) | FOCUS POWER (W) | QUALITY VALUE ($\mu m$) | GAS PRESSURE POWER (W) | QUALITY VALUE ($\mu m$) |
| 20 | 95.5 | 5 | 103.6 | 3.0 | 91.2 | 20 | 95.1 | 21.0 | 124.2 | 3 | 113.2 |
| 25 | 97.2 | 10 | 105.1 | 3.5 | 93.2 | 21 | 95.8 | 21.1 | 123.1 | 4 | 110.2 |
| 30 | 98.1 | 15 | 108.1 | 4.0 | 95.8 | 22 | 97.3 | 21.2 | 121.8 | 5 | 110.7 |
| 35 | 102.5 | 20 | 106.5 | 4.5 | 96.3 | 23 | 98.1 | 21.3 | 120.5 | 6 | 108.2 |
| 40 | 107.5 | 25 | 107.1 | 5.0 | 98.3 | 24 | 99.2 | 21.4 | 119.4 | 7 | 112.6 |
| 45 | 108.3 | 30 | 111.5 | 5.5 | 101.2 | 25 | 102.5 | 21.5 | 117.2 | | |
| 50 | 110.2 | 35 | 109.2 | 6.0 | 103.6 | 26 | 103.1 | 21.6 | 115.1 | | |
| 55 | 110.7 | 40 | 110.6 | 6.5 | 104.2 | 27 | 106.8 | 21.7 | 113.5 | | |
| 60 | 111.3 | 45 | 111.2 | 7.0 | 105.2 | 28 | 108.1 | 21.8 | 110.1 | | |
| 65 | 111.5 | 50 | 109.3 | 7.5 | 107.2 | 29 | 110.3 | 21.9 | 108.4 | | |
| 70 | 114.6 | 55 | 111.2 | 8.0 | 108.1 | 30 | 110.2 | 22.0 | 105.3 | | |
| 75 | 118.3 | 60 | 109.0 | 8.5 | 110.2 | 31 | 113.2 | 22.1 | 102.2 | | |
| 80 | 121.2 | 65 | 113.4 | 9.0 | 110.8 | 32 | 114.6 | 22.2 | 100.2 | | |
| 85 | 122.1 | 70 | 115.1 | 9.5 | 111.5 | 33 | 115.7 | 22.3 | 103.5 | | |
| 90 | 123.2 | 75 | 111.3 | 10.0 | 112.3 | 34 | 119.2 | 22.4 | 105.4 | | |
| 95 | 123.8 | 80 | 107.1 | 10.5 | 112.7 | 35 | 119.9 | 22.5 | 108.2 | | |
| 100 | 124.6 | 85 | 113.2 | 11.0 | 113.1 | 36 | 120.6 | 22.6 | 112.4 | | |
| | | 90 | 115.2 | 11.5 | 114.2 | 37 | 121.4 | 22.7 | 116.1 | | |
| | | 95 | 114.8 | 12.0 | 115.0 | 38 | 122.3 | 22.8 | 121.3 | | |
| | | 100 | 111.3 | 12.5 | 115.7 | 39 | 124.1 | 22.9 | 123.1 | | |
| | | | | 13.0 | 117.1 | 40 | 126.2 | 23.0 | 125.2 | | |
| | | | | 13.5 | 117.8 | | | | | | |
| | | | | 14.0 | 118.1 | | | | | | |
| | | | | 14.5 | 118.7 | | | | | | |
| | | | | 15.0 | 119.0 | | | | | | |
| | | | | 15.5 | 119.1 | | | | | | |
| | | | | 16.0 | 119.3 | | | | | | |
| | | | | 16.5 | 119.7 | | | | | | |
| | | | | 17.0 | 121.1 | | | | | | |
| | | | | 17.5 | 122.1 | | | | | | |
| | | | | 18.0 | 123.7 | | | | | | |
| | | | | 18.5 | 123.9 | | | | | | |
| | | | | 19.0 | 125.1 | | | | | | |
| | | | | 19.5 | 126.2 | | | | | | |
| | | | | 20.0 | 126.8 | | | | | | |

[FIG. 12]
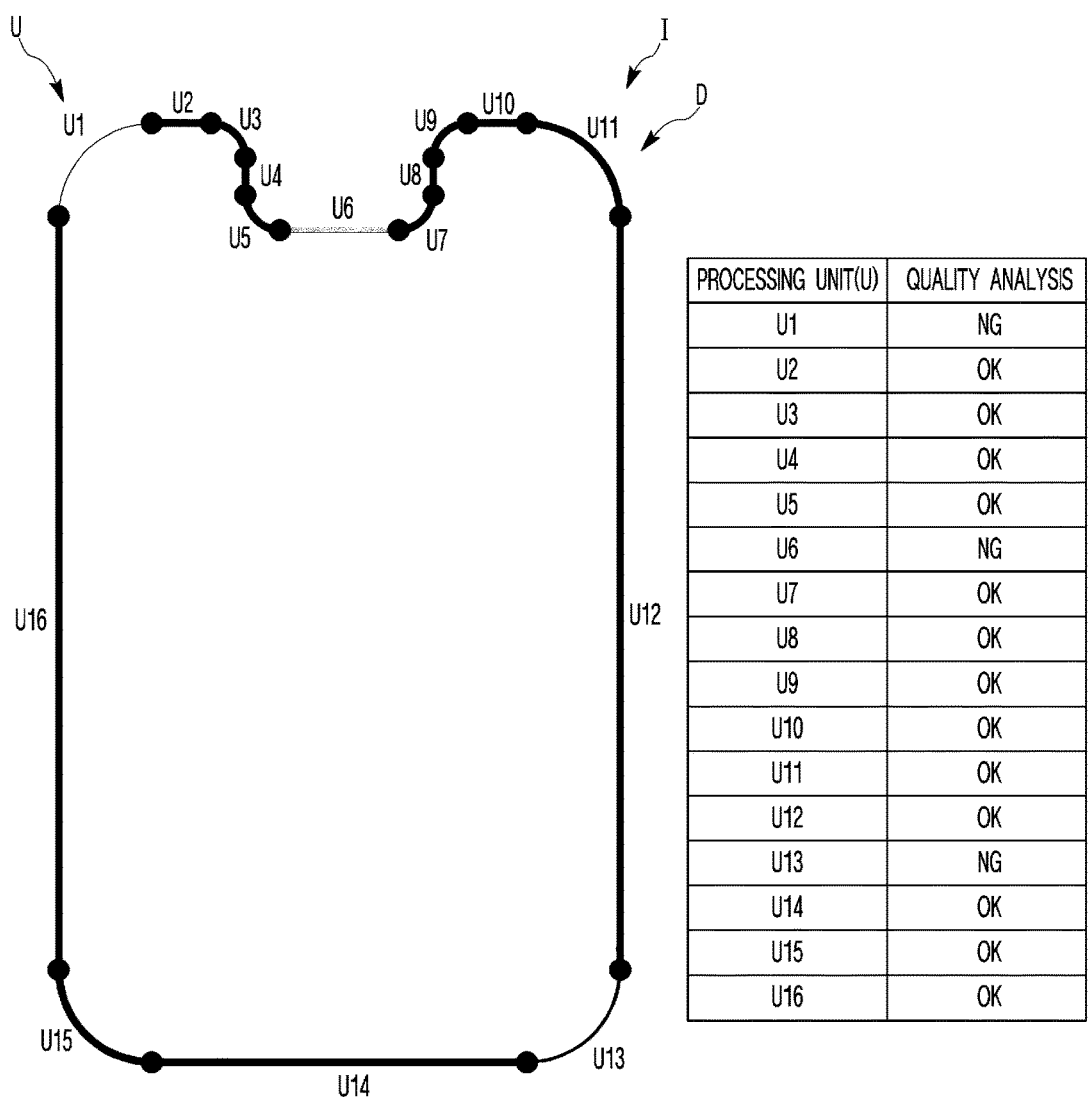

[FIG. 13]
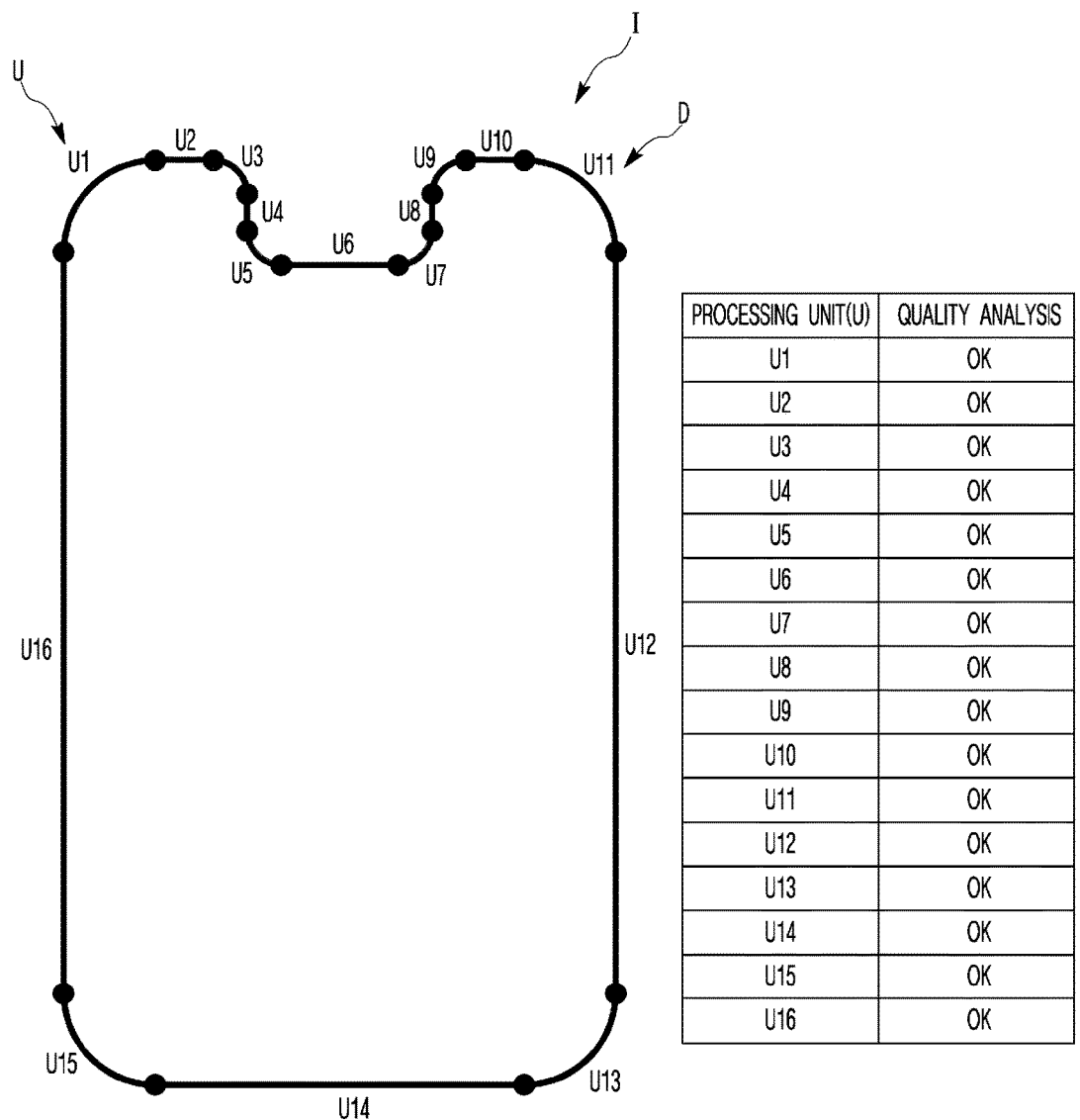

LASER PROCESSING SYSTEM AND METHOD

CROSS-REFERENCE TO RELATED APPLICATION

This application claims priority to Korean Patent Application No. 10-2020-0018738, filed on Feb. 17, 2020, and Korean Patent Application No. 10-2020-0056878, filed on May 13, 2020, in the Korean Intellectual Property Office, the disclosure of which is incorporated herein by reference.

BACKGROUND OF THE DISCLOSURE

Field of the Disclosure

The present disclosure relates to a laser processing system and a laser processing method.

Description of the Related Art

In general, in laser processing such as cutting and marking, the laser processing quality of a processing target for quality items such as cutting line width, marking line width, marking depth, and marking color can be controlled by changing set values for processing parameters such as the power, frequency, pulse width, duty ratio, and focal length of a laser beam and the pressure of an assist gas.

Conventionally, an operator manually changes set values for processing parameters to control the laser processing quality of a processing target according to the material and shape of the processing target, a processing purpose, and the like. As such, in the related art, since an operator controls laser processing quality by manually changing set values for processing parameters, there is a problem in that laser processing quality and time and cost required to control the laser processing quality significantly depend on the number of operators and the skill of the operators.

SUMMARY OF THE DISCLOSURE

Therefore, the present disclosure has been made in view of the above problems, and it is an object of the present disclosure to provide an improved laser processing system and an improved laser processing method that are capable of automatically performing operation of controlling laser processing quality.

It is another object of the present disclosure to provide an improved laser processing system and an improved laser processing method that are capable of reducing time required to control laser processing quality.

In accordance with one aspect of the present disclosure, provided is a laser processing system including a processing machine for performing laser processing on a processing target using a laser beam according to a predetermined processing design; a setting module for preparing a processing recipe including a plurality of set values for testing of processing parameters for controlling a quality value of a predetermined quality item; a controller for repeatedly performing first test processing for the processing target in multiple implementation rounds by driving the processing machine by selectively using any one of the set values for testing as the set value of the processing parameters according to a predetermined order; and an analysis module for analyzing each of results of the first test processing and individually measuring a quality value of each of the results of the first test processing, and selecting, among the set values for testing, a set value for testing used in a specific implementation round of the first test processing, at which the quality value that most satisfies predetermined reference quality is measured, as a set value for mass production of the processing parameters.

Preferably, the laser processing system further includes an input module provided to input at least one of the processing design and the reference quality.

Preferably, the setting module sets the set values for testing according to predetermined setting criteria, wherein the setting criteria include a minimum set value that is a smallest absolute value among the set values for testing, a maximum set value that is a largest absolute value among the set values for testing, and a unit interval of the set values for testing.

Preferably, the input module is provided to input at least one of the minimum set value, the maximum set value, and the unit interval.

Preferably, when the reference quality is a reference quality value, the analysis module selects, as the set value for mass production, a set value for testing used in a specific implementation round of the first test processing, at which the quality value having a smallest error based on the reference quality value among the set values for testing is measured, and when the reference quality is within a reference quality range, the analysis module selects, as the set value for mass production, a set value for testing used in a specific implementation round of the first test processing, at which the quality value having a smallest error based on a median of the reference quality range among the set values for testing is measured.

Preferably, the setting module divides the processing design into a plurality of processing units having identical or different processing shapes according to a processing shape of the processing design, and individually prepares the processing recipe for each of the processing units according to a processing shape of each of the processing units.

Preferably, the controller individually performs first test processing for each of the processing units, wherein, when first test processing for a specific processing unit among the processing units is performed, the first test processing is performed by selectively using the set values for testing included in the processing recipe for the specific processing unit, and the analysis module analyzes results of the first test processing for each of the processing units, and individually selects the set value for mass production from the processing recipe for each of the processing units.

Preferably, when laser processing is performed on a specific processing unit among the processing units, the controller drives the processing machine by selectively using the set value for mass production selected from a processing recipe for the specific processing unit to perform second test processing on the processing target, and the analysis module divides and analyzes results of the second test processing for each of the processing units, individually measures the quality value for each of the processing units, and determines whether each of the processing units is defective.

Preferably, the analysis module determines that a processing unit having the quality value satisfying the reference quality among the processing units is good, and determines that a processing unit having the quality value that does not satisfy the reference quality among the processing units is defective.

Preferably, the analysis module reselects the set value for mass production from the processing recipe for the processing unit that has been determined to be defective, and the controller performs the second test processing once more using the reselected set value for mass production.

Preferably, the setting module inputs the quality value of each of results of the first test processing to the processing recipe so that the quality value matches the set value for testing used at a specific implementation round of the first test processing in which the quality value is measured, and the analysis module reselects, as a new set value for mass production, a quality value satisfying reference quality as a next rank of a quality value matching a set value for testing previously selected as the set value for mass production among quality values entered in the processing recipe for the processing unit that has been determined to be defective.

Preferably, the setting module prepares the processing recipe so that a set value for testing of each of a plurality of processing parameters for controlling the quality value of the quality item is individually included.

Preferably, when the first test processing is performed, for each of remaining processing parameters except for a specific processing parameter among the processing parameters, the controller uses a predetermined default set value as a set value of each of the remaining processing parameters, and selectively uses any one set value for testing among set values for testing for the specific processing parameter as a set value of the specific processing parameter, and the analysis module identifies which of the processing parameters is associated with the set value for mass production when results of the first test processing are analyzed and the set value for mass production is selected.

Preferably, when the second test processing is performed, the controller uses the set value for mass production as a set value of a specific processing parameter associated with the set value for mass production among the processing parameters, and uses, as a set value of each of remaining processing parameters except for the specific processing parameter, a predetermined default set value of each of the remaining processing parameters.

In accordance with another aspect of the present disclosure, provided is a laser processing method, characterized in that laser processing is performed on a processing target using a processing machine according to a processing design, the method including step (a) of preparing, according to predetermined setting criteria, a processing recipe including a plurality of set values for testing of processing parameters for controlling a quality value of a predetermined quality item; step (b) of repeatedly performing first test processing for the processing target in multiple implementation rounds by driving the processing machine by selectively using any one of the set values for testing as the set value of the processing parameters according to a predetermined order; step (c) of analyzing each of results of the first test processing and individually measuring a quality value of each of the results of the first test processing; and step (d) of selecting, among the set values for testing, a set value for testing used in a specific implementation round of the first test processing, at which the quality value that most satisfies predetermined reference quality is measured, as a set value for mass production of the processing parameters.

Preferably, the setting criteria include a minimum set value that is a smallest absolute value among the set values for testing, a maximum set value that is a largest absolute value among the set values for testing, and a unit interval of the set values for testing.

Preferably, when the reference quality is a reference quality value, in step (d), a set value for testing used in a specific implementation round of the first test processing, at which the quality value having a smallest error based on the reference quality value among the set values for testing is measured, is set as the set value for mass production, and when the reference quality is within a reference quality range, in step (d), a set value for testing used in a specific implementation round of the first test processing, at which the quality value having a smallest error based on a median of the reference quality range among the set values for testing is measured, is set as the set value for mass production.

Preferably, the laser processing method further includes step (f) of dividing the processing design into a plurality of processing units having identical or different processing shapes according to a processing shape of the processing design, and in step (a), the processing recipe for each of the processing units is individually prepared according to a processing shape of each of the processing units.

Preferably, in step (b), first test processing for each of the processing units is individually performed, wherein, when first test processing for a specific processing unit among the processing units is performed, the first test processing is performed by selectively using the set values for testing included in the processing recipe for the specific processing unit; in step (c), results of the first test processing for each of the processing units are analyzed; and in step (d), the set value for mass production is individually selected from the processing recipe for each of the processing units.

Preferably, the laser processing method further includes step (g) of, when laser processing is performed on a specific processing unit among the processing units, driving the processing machine by selectively using the set value for mass production selected from a processing recipe for the specific processing unit to perform second test processing on the processing target; and step (h) of dividing and analyzing results of the second test processing for each of the processing units, individually measuring the quality value for each of the processing units, and determining whether each of the processing units is defective.

Preferably, in step (h), a processing unit having the quality value satisfying the reference quality among the processing units is determined to be good, and a processing unit having the quality value that does not satisfy the reference quality among the processing units is determined to be defective.

Preferably, the laser processing method further includes step (i) of reselecting the set value for mass production from the processing recipe for the processing unit that has been determined to be defective; and step (j) of performing the second test processing once more using the set value for mass production reselected in step (i).

Preferably, in step (c), the quality value of each of results of the first test processing is input to the processing recipe so that the quality value matches the set value for testing used at a specific implementation round of the first test processing in which the quality value is measured, and in step (i), among quality values entered in the processing recipe for the processing unit that has been determined to be defective, a quality value satisfying reference quality as a next rank of a quality value matching a set value for testing previously selected as the set value for mass production is reselected as a new set value for mass production.

Preferably, in step (a), the processing recipe is prepared so that a set value for testing of each of a plurality of processing parameters for controlling the quality value of the quality item is individually included.

Preferably, in step (b), when the first test processing is performed, for each of remaining processing parameters except for a specific processing parameter among the processing parameters, a predetermined default set value is used as a set value of each of the remaining processing parameters, and any one set value for testing among set values for testing for the specific processing parameter is selectively used as a set value of the specific processing parameter.

Preferably, in step (d), when the second test processing is performed, the set value for mass production is used as a set value of a specific processing parameter associated with the set value for mass production among the processing parameters, and, as a set value of each of remaining processing parameters except for the specific processing parameter, a predetermined default set value of each of the remaining processing parameters is used.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a block diagram showing the schematic configuration of a laser processing system according to a preferred embodiment of the present disclosure;

FIG. 2 is a drawing for explaining the concept of cutting line width;

FIG. 3 is a drawing for explaining the concepts of marking line width and marking depth;

FIG. 4 is a perspective view schematically showing the configuration of the processing machine shown in FIG. 1;

FIG. 5 is a flowchart for explaining a laser processing method using a laser processing system;

FIG. 6 is a drawing for explaining a method of setting the processing design of a processing target and the reference quality of quality items;

FIG. 7 is a drawing for explaining a method of setting criteria for processing parameters;

FIG. 8 is a drawing for explaining a method of dividing a processing design into a plurality of processing units;

FIG. 9 is a drawing for explaining a method of preparing a processing recipe for each processing unit;

FIG. 10 is a drawing for explaining a method of performing first test processing of a processing target using set values for testing included in a processing recipe;

FIG. 11 is a drawing for explaining a method of selecting a set value for mass production among set values for testing included in a processing recipe using the results of first test processing;

FIG. 12 is a drawing for explaining a method of performing second test processing of a processing target using a set value for mass production selected from a processing recipe; and FIG. 13 is a drawing for explaining a method of performing second test processing once more using a reselected set value for mass production according to the results of the second test processing.

DETAILED DESCRIPTION OF THE DISCLOSURE

Hereinafter, the embodiments of the present disclosure will be described in detail with reference to the attached drawings. Here, when reference numerals are applied to constituents illustrated in each drawing, it should be noted that like reference numerals indicate like elements throughout the specification. In addition, in the following description of the present disclosure, a detailed description of known functions and configurations incorporated herein will be omitted when it may make the subject matter of the present disclosure unclear.

In describing the components of the embodiments of the present disclosure, terms such as first, second, A, B, (a), and (b) may be used. These terms are used to distinguish each component from other components, and the nature or order of the components is not limited by these terms.

In addition, unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram showing the schematic configuration of a laser processing system according to a preferred embodiment of the present disclosure.

Referring to FIG. 1, a laser processing system 1 according to a preferred embodiment of the present disclosure is a laser processing system for manufacturing products by performing laser processing on a processing target F according to a processing design D, and may include a controller 10 for controlling the overall operation of the laser processing system 1; a processing machine 20 for performing laser processing on the processing target F using a laser beam LB; a storage module 30 for storing data for controlling laser processing quality and various data about the laser processing system 1; an input module 40 provided to input data about the processing design D, data for controlling laser processing quality, and various data about the laser processing system 1; a setting module 50 for preparing a processing recipe for selectively driving the laser processing system 1 so that the quality values of quality items representing laser processing quality satisfy predetermined reference quality; a display module 60 for displaying the driving state of the laser processing system 1 and various data about the laser processing system 1 as images; an imaging module 70 for photographing the laser processing result of the processing target F; and an analysis module 80 for analyzing a captured image I of the laser processing result photographed by the imaging module 70 and measuring the laser processing quality of the processing target F.

The type of the processing target F to be laser-processed using the laser processing system 1 is not particularly limited. For example, the processing target F may be a polarizing film sheet applied to displays of mobile phones, tablets, or other terminals.

FIG. 2 is a drawing for explaining the concept of cutting line width, and FIG. 3 is a drawing for explaining the concepts of marking line width and marking depth.

Among various quality items representing the laser processing quality of the processing target F, the type of quality item, the degree of quality of which may be controlled using the laser processing system 1, is not particularly limited. For example, the quality items may include cutting line width, marking line width, marking depth, and marking color, and the degree of quality of the quality item may be controlled using the laser processing system 1.

First, referring to FIG. 2, in the case of performing laser cutting processing, a cutting line width Wc refers to the width of a tapered surface Fi constituting the cutting surface of the processing target F, but the present disclosure is not limited thereto. In general, when laser cutting processing is performed, since the processing target F is cut so that the cutting surface thereof is inclined, the cutting surface of the processing target F is composed of the tapered surface Fi, and a shoulder S which is generated due to thermal deformation of the processing target F by the laser beam LB is formed at the upper portion of the tapered surface Fi.

In general, the quality of laser cutting processing is associated with the inclination angle (θ) of the tapered surface Fi. In addition, the inclination angle (θ) of the tapered surface Fi is substantially proportional to the width We of the tapered surface Fi, i.e., the distance between one end of the tapered surface Fi and the other end of the tapered surface Fi in the horizontal direction of the processing target F. Accordingly, the cutting line width We may be a quality item representing the quality of laser cutting processing.

Next, referring to FIG. 3, a marking line width Wm refers to the distance between the shoulders S respectively formed on both sides of a processing point irradiated with the laser beam LB in the entire area of the processing target F when laser marking processing is performed, but the present disclosure is not limited thereto. In general, when laser marking processing is performed, a concave groove G is formed at the processing point irradiated with the laser beam LB, and the shoulders S which are generated due to thermal deformation of the processing target F by the laser beam LB are respectively formed on both upper ends of the groove G.

In general, the quality of laser marking processing is associated with the distance between the shoulders S. Accordingly, the marking line width Wm may be a quality item representing the quality of laser marking processing.

Next, referring to FIG. 3, a marking depth Dm refers to the depth of the groove G formed at a processing point irradiated with the laser beam LB when laser marking processing is performed, but the present disclosure is not limited thereto.

In general, the quality of laser marking processing is associated with the depth of the groove G. Accordingly, the marking depth Dm may be a quality item representing the quality of laser marking processing.

Next, when laser color marking processing is performed during laser marking processing, marking color may refer to the color of a processing point irradiated with the laser beam LB.

In general, the quality of laser color marking processing is associated with color applied to a processing point due to the laser beam LB. Accordingly, marking color may be a quality item representing the quality of laser color marking processing.

FIG. 4 is a perspective view schematically showing the configuration of the processing machine shown in FIG. 1.

The processing machine 20 is provided to perform laser processing on the processing target F using various processing methods, such as cutting processing and marking processing, by radiating the laser beam LB onto the processing target F.

The configuration of the processing machine 20 is not particularly limited. For example, as shown in FIG. 4, the processing machine 20 may include a mounting plate 21 on which the processing target F is mounted, an XY stage 22 for conveying the mounting plate 21 and the processing target F mounted on the mounting plate 21 in at least one of the X-axis and Y-axis directions, a laser oscillator (not shown) for generating and oscillating the laser beam LB, a laser head 23 for condensing the laser beam LB oscillated from the laser oscillator and radiating the laser beam LB onto the processing target F mounted on the mounting plate 21 to perform laser processing on the processing target F, and a head driver (not shown) for moving the laser head 23 in at least one of the X-axis and Y-axis directions.

The configuration of the XY stage 22 is not particularly limited. The XY stage 22 may include an X-axis conveyor 24 for conveying the mounting plate 21 and the processing target F mounted on the mounting plate 21 in the X-axis direction and Y-axis conveyors 25 for conveying the X-axis conveyor 24 and the mounting plate 21 and the processing target F that are coupled to the X-axis conveyor 24 in the Y-axis direction.

In addition, the laser head 23 is preferably composed of a scan head capable of radiating the laser beam LB onto a scan area (As) having a predetermined area by switching the optical path of the laser beam LB in any one of the X-axis and Y-axis directions, but the present disclosure is not limited thereto.

When the processing machine 20 is configured as described above, the XY stage 22 may convey the processing target F in at least one of the X-axis and Y-axis directions, and the laser head 23 may radiate the laser beam LB onto the processing target F conveyed by the XY stage 22. Thereby, laser processing of the processing target F may be performed using the processing machine 20 to manufacture a product.

Next, the imaging module 70 is provided to photograph the processing target F laser-processed by the processing machine 20. To perform this function, the imaging module 70 may include at least one camera (not shown) capable of photographing the processing target F laser-processed by the processing machine 20. The type of camera used to photograph the processing target F is not particularly limited. For example, the imaging module 70 may include a charge-coupled device (CCD) camera, a 3D camera, or the like. The imaging module 70 may input the captured image I of the laser-processed processing target F, i.e., a laser processing result, generated by a camera to the storage module 30 or the display module 60.

FIG. 5 is a flowchart for explaining a laser processing method using a laser processing system.

Referring to FIG. 5, the laser processing method using the laser processing system 1 may include step S10 of setting reference quality for the processing design D and the predetermined quality item of the processing target F, respectively; step S20 of individually setting the setting criteria of each of processing parameters for controlling the quality value of the predetermined quality item according to reference quality; step S30 of dividing, according to the entire processing shape of the processing design D, the processing design D into a plurality of processing units U having identical or different processing shapes; step S40 of individually preparing, for each of the processing units U, a processing recipe including the set value for testing of each of the processing parameters generated according to the setting criteria of each of the processing parameters; step S50 of performing first test processing of the processing target F by driving the processing machine 20 by selectively using set values for testing included in each of processing recipes and analyzing the results of the first test processing; step S60 of individually selecting a set value for mass production for each processing recipe among set values for testing based on the analysis of the results of the first test processing; step S70 of performing second test processing of the processing target F by driving the processing machine 20 by selectively using set values for mass production selected from each processing recipe and analyzing the results of the second test processing; and step S80 of determining, based on the analysis of the results of the second test processing, whether the results of the second test processing are defective.

FIG. 6 is a drawing for explaining a method of setting the processing design of a processing target and the reference quality of quality items.

In step S10, the processing design D of the processing target F and the reference quality of predetermined quality items are set.

First, the processing design D of the processing target F to be laser-processed is set. The processing design D of the processing target F corresponds to the design of a product manufactured by performing laser processing on the processing target F, and may be provided to have a processing shape corresponding to the shape of a product to be manufactured using the processing target F. For example, as shown in FIG. 6, in the case of manufacturing a display panel for mobile phones by performing laser cutting processing on the processing target F, the processing design D may be provided to have a processing shape corresponding to the shape of the display panel for mobile phones.

As shown in FIG. 6, the processing shape of the processing design D may be defined by at least one pattern to be processed (E). To manufacture a product by performing laser processing on the processing target F, according to the shape and type of a product, the type of laser processing required to manufacture the product, and the like, line processing characterized by radiating the laser beam LB onto the processing target F to form a line-shaped pattern, dot processing characterized by radiating the laser beam LB onto the processing target F to form a dot-shaped pattern, or the like may be performed. Accordingly, the pattern to be processed (E) may be composed of at least one of a line and a dot.

In addition, according to the processing shape of the processing design D, the pattern to be processed (E) may include a plurality of sections having identical or different shapes, such as straight sections and curved sections. Accordingly, by performing laser processing on the processing target F by radiating the laser beam LB onto the processing target F using the processing machine 20 according to the pattern to be processed (E), a product may be manufactured using the processing target F.

In addition, a method of setting the processing design D is not particularly limited. For example, an operator may set the processing design D by manually inputting the processing design D using the input module 40 to the storage module 30 or the setting module 50, or by uploading design data previously stored in the storage module 30 to the setting module 50.

The configuration of the input module 40 is not particularly limited. For example, the input module 40 may include a touch screen for displaying the driving state of the laser processing system 1 and various data as images and inputting the control signals of the laser processing system 1 and various data. In this case, the input module 40 may also function as the display module 60.

Next, among quality items, the reference quality of a specific quality item for controlling the degree of quality, i.e., quality value, using the laser processing system 1 is set. The reference quality refers to a reference quality value or a range of reference quality values indicating that the laser processing quality for the specific quality item is good, but the present disclosure is not limited thereto. For example, as shown in FIG. 6, when laser processing quality for line width is controlled using the laser processing system 1, reference quality may be a reference cutting line width value or a range of a reference cutting line width values indicating that laser processing quality of cutting line width is good.

A method of setting reference quality is not particularly limited. For example, an operator may set reference quality by manually inputting reference quality using the input module 40 to the storage module 30 or the setting module 50, or by uploading quality data previously stored in the storage module 30 to the setting module 50.

FIG. 7 is a drawing for explaining a method of setting criteria for processing parameters.

In step S20, the setting criteria of each of the processing parameters of the laser processing system 1 is set according to reference quality.

In general, the laser processing aspect of the processing target F may be different depending on the material and processing speed of the processing target F. Accordingly, as shown in FIG. 7, prior to setting the setting criteria for each of processing parameters, it is preferably for an operator to preferentially set the material and processing speed of the processing target F (step S22).

A method of setting the material and processing speed of the processing target F is not particularly limited. For example, an operator may set the material and processing speed of the processing target F by manually inputting the material and processing speed of the processing target F to the storage module 30 or the setting module 50 using the input module 40, or by uploading data about the material and processing speed of the processing target F previously stored in the storage module 30 to the setting module 50. When first and second test processing to be described later are performed, the controller 10 may selectively drive the processing machine 20 based on at least one of the material and processing speed of the processing target F set according to the above manner, thereby improving laser processing quality.

In addition, the processing parameters refer to various factors, such as factors for the characteristics of the laser beam LB and factors for a laser processing environment, that may affect laser processing quality. Accordingly, to selectively control the quality value of a specific quality item for which reference quality is set in step S10, among various processing parameters of the laser processing system 1, an operator may selectively set the setting criteria of each of variable parameters that affect the quality value of the specific quality item for which reference quality is set in step S10 (step S24).

For example, when reference quality for cutting line width is set in step S10, processing parameters may include the power (W), frequency (kHz), pulse width (μs), duty ratio (%), and focal length (mm) of the laser beam LB, the pressure (Bar) of assist gas, and the like. Here, the assist gas is a gas that is sprayed at a processing point irradiated with the laser beam LB during laser processing, and may separate, from the processing point, materials melted, decomposed, and evaporated by the laser beam LB. Preferably, the assist gas is an inert gas, but the present disclosure is not limited thereto.

Content included in the setting criteria for each of processing parameters is not particularly limited. For example, the setting criteria for each of processing parameters may include a minimum set value (Min), a maximum set value (Max), and a unit interval.

The minimum set value (Min) may correspond to a set value for testing having the smallest absolute value among the set values for testing of processing parameters included in a processing recipe. On the other hand, the maximum set value (Max) may correspond to a set value for testing having the largest absolute value among the set values for testing of processing parameters included in a processing recipe. The minimum set value (Min) and the maximum set value (Max) may be used to determine the setting range of set values for testing.

In addition, operation data for various operations previously performed using the laser processing system 1 may be stored in the storage module 30 in an accumulative manner. Thus, the setting module 50 compares at least one of the processing design D and the reference quality that have been set in step S10 and the material and processing speed of the processing target F (hereinafter referred to as "processing conditions") that have been set in step S20 with operation data accumulated in the storage module 30. In addition, based on these comparison results, the setting module 50 may set the minimum set value (Min) and maximum set value (Max) of each of processing parameters. However, the present disclosure is not limited thereto, and an operator may manually input at least one of the minimum set value (Min) and maximum set value (Max) of each of processing parameters to the storage module 30 or the setting module 50 using the input module 40.

The unit interval corresponds to the setting interval of the set values for testing of processing parameters included in a processing recipe. Accordingly, the number of set values for testing included in a processing recipe to be described later is determined according to the absolute value of a unit interval, and thus the number of set values for testing may be controlled by adjusting the unit interval. The setting module 50 may derive the unit interval of each of processing parameters based on operation data accumulated in the storage module 30 so that an appropriate number of set values for testing is included in a processing recipe (see automatic setting unit interval of FIG. 7). However, the present disclosure is not limited thereto, and an operator may set the unit interval for each of processing parameters by manually inputting the unit interval for each of processing parameters to the storage module 30 or the setting module 50 using the input module 40 (see manual setting unit interval of FIG. 7). For example, upon determining that the number of set values for testing included in a processing recipe is too large, an operator may manually reset a unit interval to reduce the number of set values for testing to an appropriate level.

FIG. 8 is a drawing for explaining a method of dividing a processing design into a plurality of processing units.

In step S30, the setting module 50 divides the processing design D into a plurality of the processing units U according to the processing shape of the processing design D.

Referring to FIG. 8, when the pattern to be processed (E) includes a plurality of sections having different shapes such as a straight section and a curved section, the setting module 50 may divide the processing design D into a plurality of the processing units U each including a section having a specific shape among all sections of the pattern to be processed (E) and may store the divided processing design D in the storage module 30.

For example, as shown in FIG. 8, the processing design D may be divided into at least one curve processing unit (U1, U3, U5, U7, U9, U11, U13, and U15) having identical or different curvatures (R=2, R=3, R=10, and the like) and at least one straight processing unit (U2, U4, U6, U8, U10, U12, U14, and U16) having identical or different lengths.

FIG. 9 is a drawing for explaining a method of preparing a processing recipe for each processing unit.

In general, laser processing quality may be changed according to the shape of the radiation path of the laser beam LB, such as whether the radiation path of the laser beam LB is a straight line or a curved line and a radius of curvature of the radiation path of the laser beam LB. According to the laser processing system 1, the radiation path of the laser beam LB is determined by the processing design D, i.e., the shape of the pattern to be processed (E). Accordingly, even when laser processing is performed on the processing target F while maintaining a processing parameter at a constant value, the laser processing quality of the processing target F may be different for each of the processing units U due to difference in the processing shapes of the processing units U.

Accordingly, in step S40, the setting module 50 may individually prepare a processing recipe for each of the processing units U and then may store the processing recipe in the storage module 30 so that laser processing is performed on the processing units U in the same manner or different manners according to the processing shape of each of the processing units U.

For example, when the processing design D has four types of the processing units U including curve processing units U3 and U9 with R=2, curve processing units U5 and U7 with R=3, curve processing units U1, U11, U13, and U15 with R=10, and straight processing units U2, U4, U6, U8, U10, U12, U14, and U16 with R=∞, one processing recipe may be prepared for each of the four types of processing units U. That is, in this case, a total of four processing recipes may be prepared.

The processing recipe refers to a data table in which the set value for testing of each of processing parameters is stored in a table format. The set value for testing of each of processing parameters is the set value of each of processing parameters for performing first test processing of the processing target F to be described later, and is set according to setting criteria set in above-described step S20. Accordingly, the set value for testing of each of processing parameters may include at least a minimum set value and a maximum set value. In this case, the set values may be set so that an absolute value is incrementally increased by a unit interval from the minimum set value to the maximum set value. The number of set values for testing included in each of the processing recipes may be determined according to the minimum set value, maximum set value, and unit interval of each of the processing parameters. Accordingly, the processing recipes may include identical or different numbers of set values for testing.

In addition, as shown in FIG. 9, in a processing recipe, the default set value of each of processing parameters may be additionally input. The default set value refers to a set value for testing that is expected to satisfy the reference quality of predetermined quality items when laser processing is performed according to the set value for testing among set values for testing. Preferably, the default set value is individually set for each processing recipe, but the present disclosure is not limited thereto.

A method of inputting default set values is not particularly limited. For example, the setting module 50 may compare the processing conditions and processing shape of each of the processing units U with operation data accumulated in the storage module 30, may individually deduce the default set value of each of processing parameters for each processing recipe, and may input the deduced default set value to each processing recipe. However, the present disclosure is not limited thereto, and an operator may manually input a default set value to a processing recipe using the input module 40.

FIG. 10 is a drawing for explaining a method of performing first test processing of a processing target using set values for testing included in a processing recipe, and FIG. 11 is a drawing for explaining a method of selecting a set value for mass production among set values for testing included in a processing recipe using the results of first test processing.

In step S50, the controller 10 drives the processing machine 20 by selectively using the set values for testing and the default set values included in each of the processing recipes set in step S40 to perform first test processing on the processing target F, the imaging module 70 photographs the results of the first test processing, and the analysis module 80 analyzes the captured image I of the results of the first test processing to measure the quality value of a predetermined quality item.

First, the controller 10 individually performs first test processing on each of the processing units U (step S52). More specifically, the first test processing may be individually performed on each of the processing units U through a manner wherein the processing target F is irradiated with the laser beam LB using the processing machine 20 along a specific section of the pattern to be processed (E) included in each of the processing units U. For example, as shown in FIG. 10, preferably, the first test processing is individually performed on each of the processing units U so that the results of the first test processing for each of the processing units U are separated from each other by a predetermined interval, but the present disclosure is not limited thereto.

However, as shown in FIG. 8, some of all processing units U may have the same processing shape. As such, when there is a plurality of processing units U having the same processing shape, first test processing is preferably performed selectively only on any one processing unit U among the processing units U having the same processing shape, without being limited thereto.

For example, as shown in FIG. 8, when there are two curve processing units U3 and U9 with R=2, two curve processing units U5 and U7 with R=3, four curve processing units U1, U11, U13, and U15 with R=10, and eight straight processing units U2, U4, U6, U8, U10, U12, U14, and U16 with R=∞, first test processing may be selectively performed on any one of the curve processing units U3 and U9 with R=2, any one of the curve processing units U5 and U7 with R=3, any one of the curve processing units U1, U11, U13, and U15 with R=10, and any one of the straight processing units U2, U4, U6, U8, U10, U12, U14, and U16 with R=∞.

In addition, as shown in FIG. 10, when first test processing is performed on the specific processing unit U among the processing units U, first test processing is repeatedly performed in multiple implementation rounds corresponding to the number of set values for testing included in a processing recipe for the specific processing unit U among processing recipes.

For example, first test processing for the curve processing units U3 and U9 with R=2 may be repeatedly performed in implementation rounds corresponding to the number of set values for testing included in a processing recipe for the curve processing units U3 and U9 with R=2.

In addition, as shown in FIG. 10, first test processing for the specific processing unit U among the processing units U is preferably performed so that the results of first test processing for the specific processing unit U formed on the processing target F are separated from each other by a predetermined interval, but the present disclosure is not limited thereto.

In addition, the controller 10 may use a default set value for each of remaining processing parameters except for a specific processing parameter among processing parameters as the set value of each of the remaining processing parameters, may selectively use any one set value for testing among set values for testing for the specific processing parameter as the set value of the specific processing parameter according to a predetermined order, and may repeatedly perform first test processing in multiple implementation rounds. Accordingly, when the results of the first test processing are analyzed, it may be determined whether change in the set value of the specific processing parameter affects the quality value of a predetermined quality item. Preferably, the first test processing for determining whether change in the set value of the specific processing parameter affects a quality value is repeatedly performed at a number of times corresponding to the number of set values for testing for the specific processing parameter included in a processing recipe.

For example, as shown in FIG. 11, in a state wherein the set value of each of remaining processing parameters except for power among processing parameters is retained as default set values (frequency: 20 kHz, pulse width: 10.0 µs, duty ratio: 30%, focal length: 22.0 mm, and gas pressure: 5 bar), first test processing for determining whether power affects a quality value may be repeatedly performed 17 times corresponding to the number (17) of set values for testing for power included in a processing recipe by incrementally increasing the set value of power by a unit interval of 5 W from a minimum set value of 20 W to a maximum set value of 100 W.

In addition, an order of inputting set values for testing is not particularly limited. For example, the setting module 50 may input any one of the set values for testing of a processing parameter to the controller 10 in ascending order for each implementation round of first test processing.

When first test processing is performed as above, the laser processing quality of the results of each implementation of the first test processing formed on the processing target F may be determined according to the set value for testing of the specific processing parameter selectively input for each implementation round of the first test processing. Accordingly, when the results of the entire first test processing for each of the processing units U formed on the processing target F are compared and analyzed, it may be individually determined for each of the processing units U whether change in the set value of each of processing parameters affects the quality value of a predetermined quality item.

The first test processing is preferably performed by individually controlling the set value of each of all processing parameters according to a processing recipe, but the present disclosure is not limited thereto. For example, when laser cutting processing is performed, first test processing may be performed by controlling only the set values of some (e.g., power (W) and frequency (kHz)) of processing parameters according to the set values for testing of a processing recipe. For example, when laser marking processing is performed, first test processing may be performed by controlling only the set values of some (e.g., pulse width (µs) and duty ratio (%)) of processing parameters according to the set values for testing of a processing recipe.

Next, the imaging module 70 photographs the results of first test processing for each of the processing units U formed on the processing target F, and then stores the captured image I of the results of the first test processing in the storage module 30 (step S54).

Then, the analysis module 80 analyzes the results of the first test processing based on the captured image I of the results of the first test processing photographed by the imaging module 70, and measures the quality value of a predetermined quality item for each of the results of the first test processing (step S56). In addition, the setting module 50 inputs the measured quality value to a corresponding part of a processing recipe so that the measured quality value matches a set value for testing used in a specific implementation round of the first test processing for which the quality value has been measured (step S58).

For example, as shown in FIG. 11, when first test processing is performed on the curve processing units U3 and U9 with R=2, the setting module 50 may input, to a corresponding part of a processing recipe, the quality value (98.1 μm) of a specific implementation round of the first test processing, in which the set value for testing of power is limited to 30 W, so that the quality value matches the set value for testing (30 W) of power.

Through repetition of the above process, processing recipes may be completed by measuring a quality value according to each of set values for testing for each of processing recipes and then inputting the quality value to a corresponding part of the processing recipe.

Next, in step S60, the analysis module 80 selects, as a satisfaction value, each of quality values satisfying reference quality set in step S10 among quality values input in each of processing recipes, and then stores the quality value in the storage module 30 (step S62).

A method of selecting a satisfaction value is not particularly limited.

When a reference quality is a reference quality value, the analysis module 80 may select, as a satisfaction value, each of quality values having an error less than a predetermined first reference error based on a reference quality value among quality values.

When a reference quality is within a range of reference quality values, the analysis module 80 may select, as a satisfaction value, each of quality values within the reference quality range among quality values.

In addition, in a processing recipe, each of columns in which a satisfaction value is described is preferably specified by a predetermined method. For example, as shown in FIG. 11, in a processing recipe, columns in which satisfaction values are described may be specified with shades.

Next, the analysis module 80 selects, as excellent values, satisfaction values determined to be excellent in laser processing quality among satisfaction values, and specifies a set value for testing used in a specific implementation round of first test processing in which a quality value corresponding to the excellent value has been measured and stores the set value in the storage module 30 (step S64).

A method of selecting an excellent value is not particularly limited.

When reference quality is a reference quality value, the analysis module 80 may select, as an excellent value, each of satisfaction values, wherein an error from the reference quality value is less than a second reference error determined to have an absolute value smaller than the first reference error, among satisfaction values.

When a reference quality is within a range of reference quality values, the analysis module 80 may select, as an excellent value, each of satisfaction values, wherein an error from a median of the range of reference quality values is less than a predetermined third reference error. For example, as shown in FIG. 11, when a range of reference quality values is 100 μm to 120 μm and a third reference error is ±2 μm, the analysis module 80 may select, as an excellent value, each of satisfaction values having a cutting line width value of 108 μm to 112 μm among satisfaction values.

In addition, in a processing recipe, columns in which an excellent value and a set value for testing that match each other are described are preferably specified in a predetermined manner, respectively. For example, as shown in FIG. 11, in a processing recipe, each of columns in which an excellent value and a set value for testing that match each other are described may be specified with a box.

Thereafter, among quality values, the analysis module 80 may select, as a set value for mass production, a set value for testing used in a specific implementation round of first test processing, at which a quality value corresponding to an excellent value wherein an error from a reference quality value or a median of a range of reference quality values is the smallest is measured, for each of processing recipes, and then may store the set value for testing in the storage module 30 (step S66). In addition, the analysis module 80 may specify which of processing parameters corresponds to the selected set value for mass production, and may store the selected set value in the storage module 30. For example, as shown in FIG. 11, the analysis module 80 may select, as a set value for mass production for focal length, a set value for testing of 21.8 mm for focal length wherein a quality value of 110.1 μm having the smallest error from the median is measured.

In the case of manufacturing a product by performing mass production processing on the processing target F, a set value for mass production may be used as the set value of a processing parameter associated with the set value for mass production when laser processing is performed on a specific processing unit U associated with a processing recipe including the set value for mass production among all processing units U.

In addition, a processing parameter associated with a set value for mass production corresponds to a major processing parameter that has a great influence on a quality value for the processing unit U associated with a processing recipe including the set value for mass production. Accordingly, hereinafter, a processing parameter associated with a set value for mass production among all processing parameters is referred to as a target processing parameter, and remaining processing parameters except for the target processing parameter are referred to as normal processing parameters.

FIG. 12 is a drawing for explaining a method of performing second test processing of a processing target using a set value for mass production selected from a processing recipe.

In step S70, the controller 10 drives the processing machine 20 by selectively using the set value for mass production of a target processing parameter selected in each of processing recipes to perform second test processing on the processing target F, the imaging module 70 photographs the results of the second test processing, and the analysis module 80 analyzes the captured image I of the results of the second test processing to measure the quality value of a predetermined quality item.

First, as shown in FIG. 12, the controller 10 continuously radiates the laser beam LB onto the processing target F along the entire section of the pattern to be processed (E) using the processing machine 20. In this case, for a section that belong to a specific processing unit U among all sections of the pattern to be processed (E), the controller 10 may selectively drive the processing machine 20 according to the set value for mass production of a target processing parameter selected in a processing recipe for the specific processing unit U to perform second test processing (step S72). That is, when the second test processing is performed, laser processing is performed on the processing target F to form a product, and for a specific processing unit U currently being subjected to laser processing among all processing units U, the processing machine 20 is driven by selectively using the set value for mass production of a target processing parameter selected in a processing recipe for the specific processing unit U.

A method of performing second test processing by driving the processing machine 20 by selectively using the set value for mass production of a target processing parameter is not particularly limited. For example, when laser processing is performed on the specific processing unit U among the processing units U, the controller 10 may use a set value for mass production as the set value of a target processing parameter selected in a processing recipe for the specific processing unit U, and may use the default set value of each of normal processing parameters as the set value of each of normal processing parameters included in a processing recipe for the specific processing unit U. Thereby, the controller 10 may perform second test processing for the specific processing unit U by selectively driving the processing machine 20 and the other components of the laser processing system 1 by using the set value for mass production of a target processing parameter and the default set value of each of normal processing parameters.

Next, the imaging module 70 photographs the results of the second test processing formed on the processing target F, and then stores the captured image I of the results of the second test processing in the storage module 30 (step S74).

Thereafter, the analysis module 80 divides the captured image I of the results of the second test processing for each of the processing units U and analyzes the divided captured image I to individually measure the quality value of a predetermined quality item for each of the processing units U (step S76).

In step S80, the analysis module 80 determines whether each of the processing units U is defective based on analysis of the results of the second test processing collected in step S70.

Whether each of the processing units U is defective may be determined by individually determining whether the quality value of each of the processing units U measured in step S76 satisfies reference quality.

For example, when reference quality is a reference quality value, the analysis module 80 may compare a quality value for the specific processing unit U among the processing units U with a reference quality value. Then, when an error between the quality value and the reference quality value is less than or equal to a predetermined reference error, the analysis module 80 may judge the laser processing quality of the specific processing unit U for a predetermined quality item as good (OK). In addition, when an error between the quality value and the reference quality value exceeds a predetermined reference error, the analysis module 80 may judge the laser processing quality of the specific processing unit U for a predetermined quality item as defective (NG).

For example, when reference quality is within a reference quality range, the analysis module 80 may compare a quality value for the specific processing unit U among the processing units U with a reference quality range. Then, when a quality value is within the reference quality range, the analysis module 80 may judge the laser processing quality of the specific processing unit U for a predetermined quality item as good (OK). In addition, when a quality value is outside the reference quality range, the analysis module 80 may judge the laser processing quality of the specific processing unit U for a predetermined quality item as defective (NG).

FIG. 13 is a drawing for explaining a method of performing second test processing once more using a reselected set value for mass production according to the results of the second test processing.

When there is a specific processing unit U judged to be defective among the processing units U during second test processing, a set value for mass production may be reselected among set values for testing included in a processing recipe for the specific processing unit U judged to be defective (step S66).

For example, among remaining excellent values except for an excellent value matching a set value for testing previously selected as a set value for mass production, the analysis module 80 may reselect, as a new set value for mass production of the processing recipe, a set value for testing matching an excellent value having the smallest error based on a reference quality value or a median of a range of reference quality values. That is, among quality values input in a processing recipe for the specific processing unit U, the analysis module 80 may reselect, as a new set value for mass production of the processing recipe, a set value for testing matching an excellent value satisfying reference quality as the next order of an excellent value matching a set value for testing previously selected as a set value for mass production.

In addition, set value for mass production for the remaining processing units U that have been judged as good among the processing units U are preferably retained, but the present disclosure is not limited thereto.

In addition, step S72 of performing second test processing using the reselected set value for mass production, step S74 of photographing the results of the second test processing, step S76 of analyzing the results of the second test processing and measuring the quality value of a predetermined quality item for each of the processing units U, and step S80 of judging whether each of the processing units U is defective may be performed again sequentially.

As a result of defect judgment, when all processing units U are judged to be good, operation of selecting a set value for mass production is completed. The set value for mass production that has been selected may be used as driving data for keeping the quality value of a predetermined quality item constant at a reference quality level when laser processing is performed on the processing target F to manufacture a product in large quantities.

As a result of defect judgment, when some of the processing units U are still judged to be defective, step S66 of reselecting a set value for mass production, step S72 of performing second test processing, step S74 of photographing the results of the second test processing, step S74 of analyzing the results of the second test processing and measuring the quality value of a predetermined quality item for each of the processing units U, and step S80 of judging whether each of the processing units U is defective may be performed again sequentially.

The laser processing system 1 divides the processing design D of the processing target F into a plurality of the processing units U according to a processing shape, and automatically prepares, for each of the processing units U, a processing recipe including set values for testing for each of processing parameters that affect the quality value of a predetermined quality item based on processing conditions including the reference quality of predetermined quality items and the material and processing speed of the processing target F.

In addition, the laser processing system performs test processing in various ways by reflecting set values for testing included in a processing recipe for each of the processing units U to the processing units U, analyzes the results of test processing, and automatically selects, for each of processing recipes, a set value for mass production that most satisfies reference quality among the set values for testing of target processing parameters mainly affecting the quality value of a predetermined quality item.

Conventionally, to improve laser processing quality, an operator had to manually select the set value for mass production of a processing parameter to be applied to mass production of a product by repeatedly performing test processing while manually controlling the set value of a processing parameter depending on experience.

Accordingly, conventionally, a large amount of time and a large number of operators were required to manually select the set values for mass production of processing parameters to be applied to mass production of a product. Thus, there was a problem in that the laser processing quality of the processing target F was influenced by the skill level of an operator who selected the set values for mass production of processing parameters.

However, according to the laser processing system 1, the set values for mass production of processing parameters may be automatically selected. Accordingly, when the laser processing system is used, time and the number of operators required to select the set values for mass production of processing parameters may be reduced. In addition, regardless of the operator's skill level, the set values for mass production of processing parameters may be accurately selected according to processing conditions, thereby improving the laser processing quality of the processing target F.

In addition, the laser processing system may individually select, for each of the processing units U, a set value for mass production optimized for the processing shape of each of the processing units U using processing recipes that are individually prepared for each of the processing units U of the processing design D. Accordingly, the laser processing system may perform laser processing in an optimized manner according to the processing shape of each of the processing units U, thereby further improving the laser processing quality of the processing target F.

In addition, preferably, operation of selecting a set value for mass production described above is repeatedly performed. For example, when predetermined processing time elapses from the time when operation of selecting a set value for mass production was previously performed, operation of selecting a set value for mass production may be repeatedly performed whenever predetermined selection conditions are satisfied, such as when the power of a laser processing device is turned on. Data on set values for mass production repeatedly selected in this way may be stored in the storage module 30 in an accumulative manner. Then, when operation of selecting a set value for mass production is performed, using existing data on operation of selecting a set value for mass production accumulated in the storage module 30, the number of set values for testing included in a processing recipe may be reduced, or a minimum set value, a maximum set value, and a default set value may be accurately set. Thereby, the laser processing system 1 may reduce time and the number of operators required to perform operation of selecting a set value for mass production, and may accurately select a set value for mass production according to processing conditions, thereby further improving the laser processing quality of the processing target F.

The present disclosure relates a laser processing system and a laser processing method, and following advantages can be obtained.

First, according to the present disclosure, test processing is performed on a processing target in various manners using a processing recipe in which the set values for testing of processing parameters for controlling the quality values of quality items representing the laser processing quality of the processing target are automatically prepared according to processing conditions, such as the processing design of the processing target, and then the results of test processing are analyzed to automatically select the set value for mass production of a processing parameter for application to mass production of a product. Thus, according to the present disclosure, time and the number of operators required to perform operation of selecting the set value for mass production of a processing parameter can be reduced. In addition, regardless of the operator's skill level, the set value for mass production of a processing parameter can be accurately selected according to processing conditions, thereby improving the laser processing quality of the processing target.

Second, according to the present disclosure, a processing design is divided into a plurality of processing units according to the entire processing shape of a processing design, processing recipes for each of the processing units are individually prepared according to the processing shape of each of the processing units, test processing is individually performed on each of the processing units, and the set values for mass production of processing parameters are individually selected for each of the processing units. Thus, according to the present disclosure, laser processing can be performed in an optimized manner according to the processing shape of each of the processing units, thereby further improving the laser processing quality of the processing target.

Third, according to the present disclosure, set values for testing for each of a plurality of processing parameters capable of controlling the quality value of a predetermined quality item are input to a processing recipe, and then the set values for testing of each of the processing parameters are selectively used to perform test processing on a processing target in various manners. Thus, according to the present disclosure, a set value for mass production can be accurately selected according to processing conditions, thereby further improving the laser processing quality of the processing target.

Although the present disclosure has been described through limited examples and figures, the present disclosure is not intended to be limited to the examples. Those skilled in the art will appreciate that various modifications, additions, and substitutions are possible, without departing from the scope and spirit of the invention.

Therefore, the embodiments disclosed in the present disclosure are intended to describe the technical idea of the present disclosure, and the scope of the technical idea of the present disclosure is not limited by these embodiments. The scope of protection of the present disclosure should be defined by the following claims, and all technical ideas within the scope of protection should be construed as being included in the scope of the present disclosure.

DESCRIPTION OF SYMBOLS

1: LASER PROCESSING SYSTEM
10: CONTROLLER
20: PROCESSING MACHINE

21: MOUNTING PLATE
22: XY STAGE
23: LASER HEAD
24: X-AXIS CONVEYOR
25: Y-AXIS CONVEYOR
30: STORAGE MODULE
40: INPUT MODULE
50: SETTING MODULE
60: DISPLAY MODULE
70: IMAGING MODULE
80: ANALYSIS MODULE
F: PROCESSING TARGET
D: PROCESSING DESIGN
E: PATTERN TO BE PROCESSED
U: PROCESSING UNIT
LB: LASER BEAM

What is claimed is:

1. A laser processing method, wherein laser processing is performed on a processing target using a processing machine according to a processing design, the method comprising:
   (a) preparing, according to predetermined setting criteria, a processing recipe comprising a plurality of set values for testing of processing parameters for controlling a quality value of a predetermined quality item; wherein the plurality of set values comprises one of power, frequency, pulse width, duty ratio or focal length of a laser beam,
   (b) repeatedly performing first test processing for the processing target in multiple implementation rounds by driving the processing machine by selectively using any one of the set values for testing as a set value of the processing parameters according to a predetermined order;
   (c) analyzing each of results of the first test processing and individually measuring a quality value of each of the results of the first test processing; and
   (d) selecting, among the set values for testing, a set value for testing used in a specific implementation round of the first test processing, at which a quality value that most satisfies predetermined reference quality is measured, as a set value for manufacturing a product from the processing target of the processing parameters, wherein the manufacturing is controlled based on the set value for manufacturing the product;
   wherein the processing design is provided to have a processing shape corresponding to a shape of the product, and
   wherein the processing shape is defined by a pattern to be processed, which comprises at least one of a line and a dot,
   in step (a), the pattern to be processed includes a plurality of sections each having different shapes, the pattern to be processed is divided into a plurality of processing units each including one of the plurality of sections and the processing recipe for each of the processing units is individually prepared; and
   in step (b), first test processing for each of the processing units is individually performed, wherein, first test processing for a specific processing unit among the processing units is performed by selectively using one of the set values for testing in the processing recipe for the specific processing unit based on a shape of a corresponding section of the specific processing unit.

2. The laser processing method according to claim 1, wherein the setting criteria comprise a minimum set value that is a smallest absolute value among the set values for testing, a maximum set value that is a largest absolute value among the set values for testing, and a unit interval of the set values for testing.

3. The laser processing method according to claim 1, wherein, the reference quality is a reference quality value, in step (d), a set value for testing used in a specific implementation round of the first test processing, at which the quality value having a smallest error based on the reference quality value among the set values for testing is measured, is set as the set value for manufacturing the product.

4. The laser processing method according to claim 1, wherein,
   in step (c), results of the first test processing for each of the processing units are analyzed; and
   in step (d), the set value for manufacturing the product is individually selected from the processing recipe for each of the processing units.

5. The laser processing method according to claim 4, further comprising:
   (e) when the laser processing is performed on a specific processing unit among the processing units, driving the processing machine by selectively using the set value for manufacturing the product selected from the processing recipe for the specific processing unit to perform second test processing on the processing target; and
   (f) dividing and analyzing results of the second test processing for each of the processing units, individually measuring the quality value for each of the processing units, and determining whether each of the processing units is defective.

6. The laser processing method according to claim 5, wherein, in step (f), a processing unit having the quality value satisfying the reference quality among the processing units is determined to be good, and a processing unit having the quality value that does not satisfy the reference quality among the processing units is determined to be defective.

7. The laser processing method according to claim 6, further comprising:
   (g) reselecting the set value for manufacturing the product from the processing recipe for the processing unit that has been determined to be defective; and
   (h) performing the second test processing once more using the set value for manufacturing the product reselected in step (g).

8. The laser processing method according to claim 7, wherein, in step (c), the quality value of each of results of the first test processing is input to the processing recipe so that the quality value matches the set value for testing used at a specific implementation round of the first test processing in which the quality value is measured, and
   in step (g), among quality values entered in the processing recipe for the processing unit that has been determined to be defective, a quality value satisfying reference quality as a next rank of a quality value matching a set value for testing previously selected as the set value for manufacturing the product is reselected as a new set value for manufacturing the product.

9. The laser processing method according to claim 5, wherein, in step (a), the processing recipe is prepared so that a set value for testing of each of a plurality of processing parameters for controlling the quality value of the quality item is individually comprised.

10. The laser processing method according to claim 9, wherein, in step (b), when the first test processing is performed, for each of remaining processing parameters except for a specific processing parameter among the processing parameters, a predetermined default set value is used as a set value of each of the remaining processing parameters, and any one set value for testing among set values for testing for the specific processing parameter is selectively used as a set value of the specific processing parameter.

11. The laser processing method according to claim 9, wherein, in step (d), when the second test processing is performed, the set value for manufacturing the product is used as a set value of a specific processing parameter associated with the set value for manufacturing the product among the processing parameters, and, as a set value of each of remaining processing parameters except for the specific processing parameter, a predetermined default set value of each of the remaining processing parameters is used.

* * * * *